(12) United States Patent
Campbell

(10) Patent No.: US 11,853,081 B2
(45) Date of Patent: *Dec. 26, 2023

(54) ANGLE-OF-ATTACK FLIGHT COMPUTER SYSTEMS AND METHODS

(71) Applicant: Textron Innovations Inc., Providence, RI (US)

(72) Inventor: Kip Gregory Campbell, Hurst, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 172 days.

This patent is subject to a terminal disclaimer.

(21) Appl. No.: 17/373,682

(22) Filed: Jul. 12, 2021

(65) Prior Publication Data

US 2021/0341947 A1 Nov. 4, 2021

Related U.S. Application Data

(63) Continuation of application No. 16/399,893, filed on Apr. 30, 2019, now Pat. No. 11,061,410.

(51) Int. Cl.
*G05D 1/06* (2006.01)
*B64D 45/00* (2006.01)
*G08G 5/00* (2006.01)

(52) U.S. Cl.
CPC .......... *G05D 1/0607* (2013.01); *B64D 45/00* (2013.01); *G08G 5/0047* (2013.01)

(58) Field of Classification Search
CPC ...... G05D 1/0607; G05D 1/105; B64D 45/00; B64C 13/16; B64C 31/02; G08G 5/0047
See application file for complete search history.

(56) References Cited

U.S. PATENT DOCUMENTS

| | | | | |
|---|---|---|---|---|
| 5,209,438 | A * | 5/1993 | Wygnanski | B64C 23/00 244/200.1 |
| 5,544,526 | A * | 8/1996 | Baltins | G01P 5/165 73/182 |
| 2005/0173592 | A1* | 8/2005 | Houck, II | B64C 39/066 244/45 R |
| 2009/0143925 | A1* | 6/2009 | Lavretsky | G05D 1/0825 701/1 |

* cited by examiner

*Primary Examiner* — Mary Cheung
(74) *Attorney, Agent, or Firm* — Pramudji Law Group PLLC; Ari Pramudji

(57) ABSTRACT

According to one implementation of the present disclosure, a method for determining angle-of-attack for an unpowered vehicle is disclosed. The method includes: determining a monotonic portion of a look-up curve of an angle-of-attack operating plot; during flight, determining, by an accelerometer disposed on the unpowered vehicle, first and second accelerometer outputs, where the first and second accelerometer outputs correspond to first and second body-fixed load factor measurements, respectively; determining an operating point on the monotonic portion by applying a quotient of the first and second accelerometer outputs to the angle-of-attack operating plot; and determining an angle-of-attack parameter corresponding to the determined operating point.

20 Claims, 8 Drawing Sheets

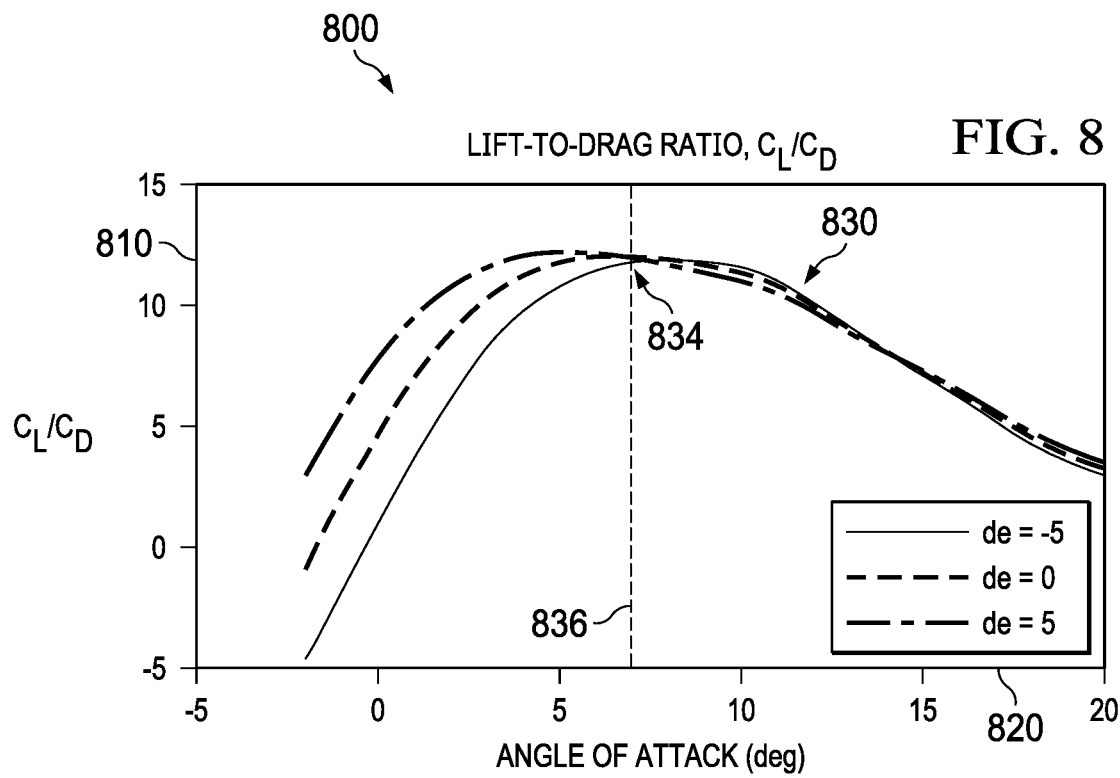
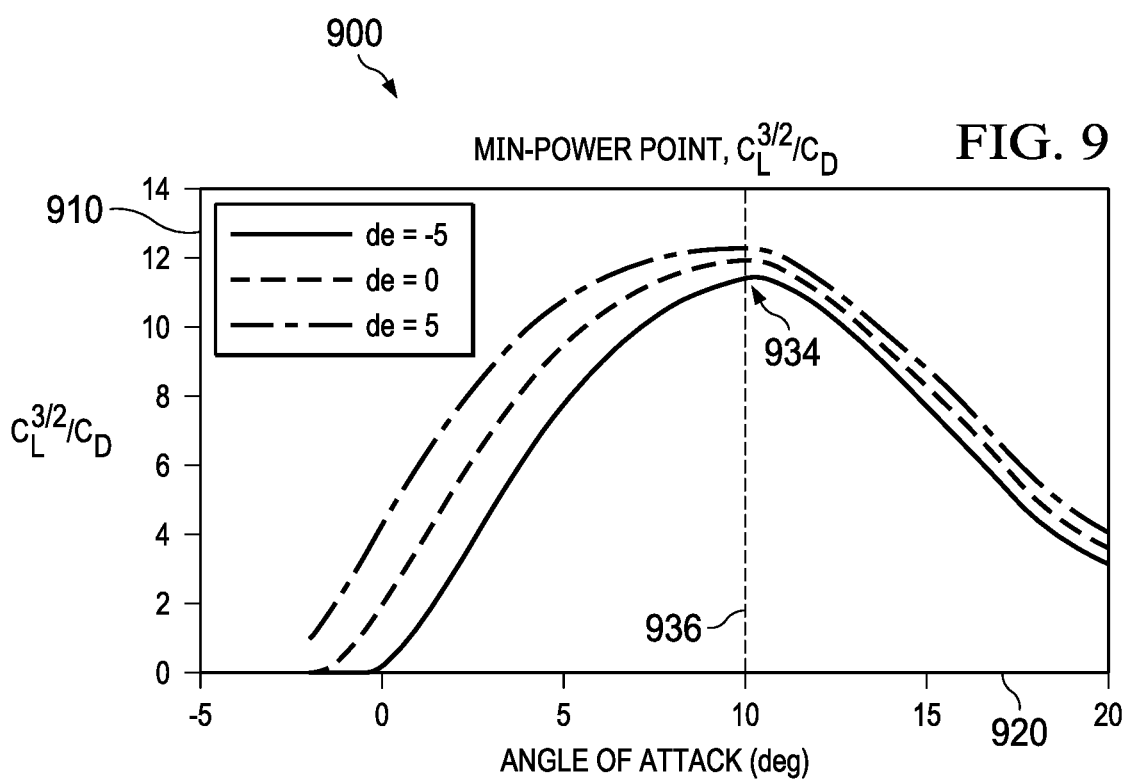

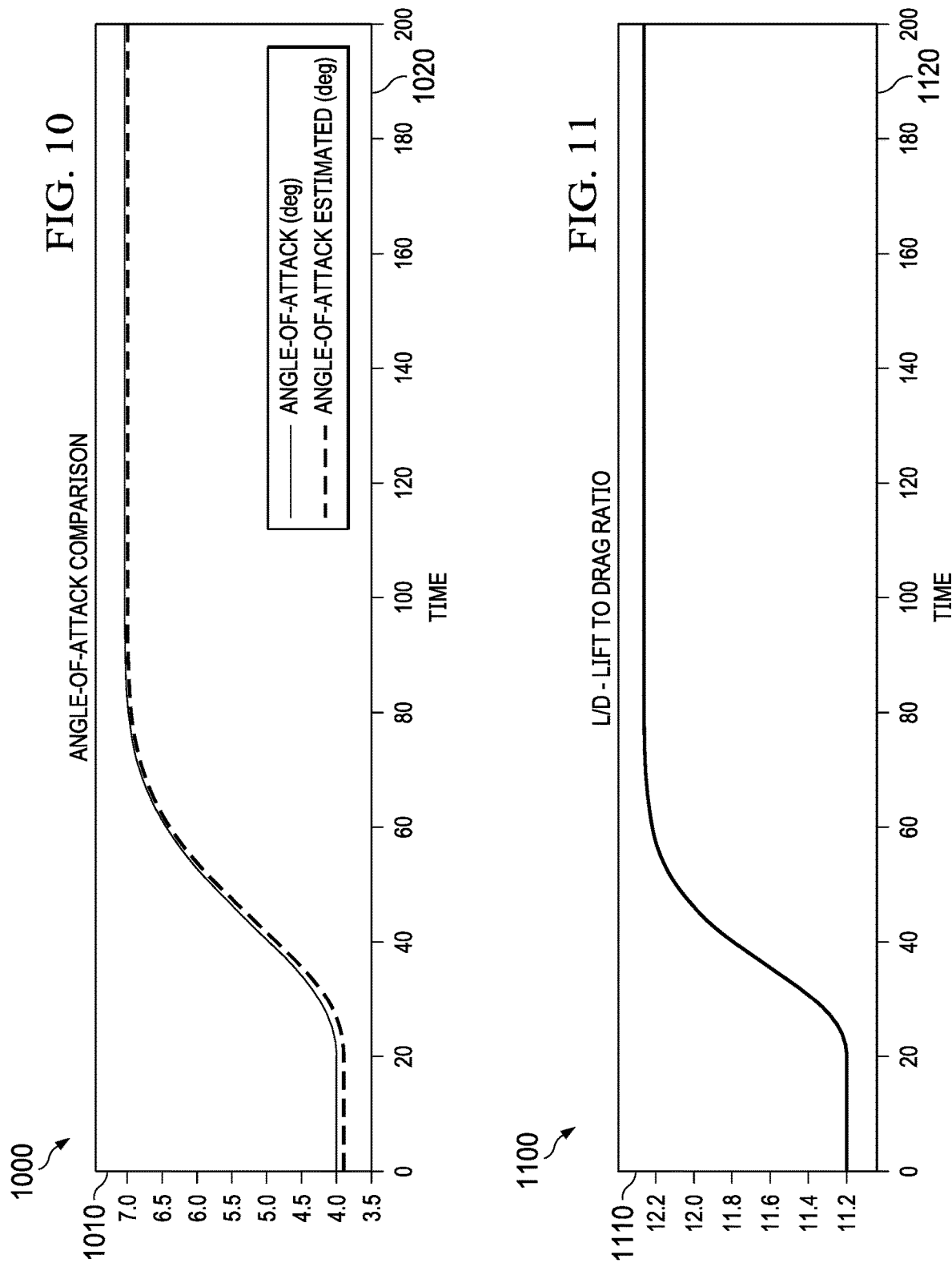

ANGLE-OF-ATTACK FLIGHT COMPUTER SYSTEMS AND METHODS

CROSS-REFERENCE TO RELATED APPLICATIONS

This application is a continuation of and claims priority to patent application number U.S. Ser. No. 16/399,893, filed 2019 Apr. 30, and the entire disclosure of which is incorporated herein by reference in its entirety.

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In aerospace applications, aerodynamic angle-of-attack of a vehicle relative to the local airstream may be required for optimal performance of a small vehicle (such as a glider). For such small vehicles, accurate estimation or measuring of angle-of-attack can be difficult to ascertain due to the size of the required probe with respect to the size of the vehicle or the weight and expense of obtaining the inertial measurements necessary for accurate estimation.

Current methods to determine angle-of-attack include direct measurement (vane, cone, or pressure(s) probe), estimation based on fusion of inertial and airspeed measurements (precise inertial measurements and accurate airspeed measurement via a pitot-static system), and table lookup versus aerodynamic normal force coefficient (that also requires accurate airspeed measurement via a pitot-static-system). However, all of these methods require the use of external probes, and the inclusion of an external probe may be prohibitively expensive and/or may not be possible due to size, weight, or expense restrictions of the vehicle.

SUMMARY

According to one implementation of the present disclosure, a method for determining angle-of-attack for an unpowered vehicle is disclosed. The method includes: determining a monotonic portion of a look-up curve of an angle-of-attack operating plot; during flight, determining, by an accelerometer disposed on the unpowered vehicle, first and second accelerometer outputs, where the first and second accelerometer outputs correspond to first and second body-fixed load factor measurements, respectively; determining an operating point on the monotonic portion by applying a quotient of the first and second accelerometer outputs to the angle-of-attack operating plot; and determining an angle-of-attack parameter corresponding to the determined operating point.

According to another implementation of the present disclosure, a flight computer system (i.e., computer, flight control system) is disclosed. The flight control system includes a processor and a memory accessible to the processor. The memory stores instructions that are executable by the processor to perform operations including determining a monotonic portion of a look-up curve of an angle-of-attack operating plot; during flight, receiving from an accelerometer disposed on the unpowered vehicle, first and second accelerometer outputs, where the first and second accelerometer outputs correspond to body-fixed load factor measurements, respectively; determining an operating point on the monotonic portion by applying a quotient of the first and second accelerometer outputs to the angle-of-attack operating plot; and determining an angle-of-attack parameter corresponding to the determined operating point.

According to another implementation of the present disclosure, a non-transitory computer-readable storage device storing instructions that, when executed by a processor, cause the processor to: determine a monotonic portion of a look-up curve of an angle-of-attack operating plot; during flight, receive from an accelerometer disposed on the unpowered vehicle, first and second accelerometer outputs, wherein the first and second accelerometer outputs correspond to body-fixed load factor measurements, respectively; determine an operating point on the monotonic portion by applying a quotient of the first and second accelerometer outputs to the angle-of-attack operating (look-up) plot; and determine an angle-of-attack parameter corresponding to the determined operating point.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

FIG. 8 illustrates a graphical representation in accordance with implementations of various techniques described herein.

FIG. 9 illustrates a graphical representation in accordance with implementations of various techniques described herein.

FIG. 10 illustrates a graphical representation in accordance with implementations of various techniques described herein.

FIG. 11 illustrates a graphical representation in accordance in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Advantageously, systems and methods of the present disclosure allow for the determination of an aerodynamic angle-of-attack (AOA) parameter (corresponding to a particular AOA orientation angle) without the use of a pitot-static system including pitot-static probes (e.g., tubes, cones, vanes, etc.) having relatively bulky and/or heavy sensors. In addition, in contrast to conventional methods, because such probes are not required for measurement, estimation, and/or computer process, advantageously, the angle-of-attack for a gliding vehicle (i.e., an unpowered vehicle) can be determined directly with the utilization of a flight computer system and an accelerometer disposed on the gliding vehicle. In example implementations, gliding vehicles include, but are not limited to, sailplanes, meteorological or battle damage assessment gliders, gliding submunitions, model airplanes, or any similar flight vehicle not under direct power (e.g., a general aviation aircraft gliding with power off/engine out).

As a further advantage, in certain inventive aspects, the present disclosure allows for the capacity of a flight computer system to generate a flight profile of the unpowered vehicle. Also, in certain inventive aspects, the present disclosure allows for the capacity of a flight computer system (utilizing a closed-loop control system) to determine and correct (i.e., adjust) an AOA orientation of the unpowered vehicle to an AOA orientation having the most advantageous lift-to-drag (i.e., lift-to-drag ratio, L/D) for maximum distance coverage.

Figure 1:
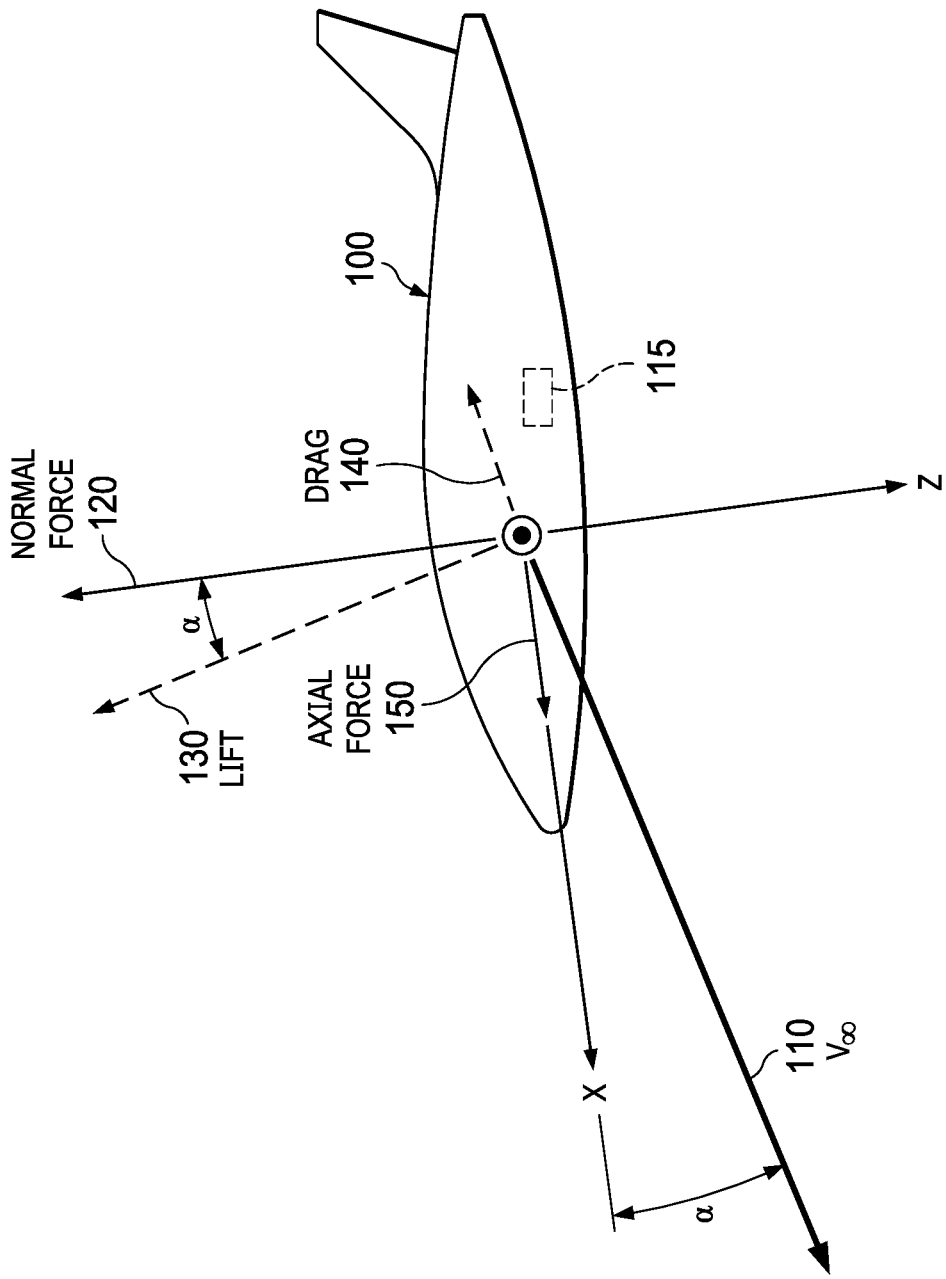
FIG. 1 illustrates a side view of a vehicle in accordance with implementations of various techniques described herein.

FIG. 1 illustrates a side view of an unpowered vehicle 100 (e.g., small glider, vehicle) during flight according to one implementation. As shown, the unpowered vehicle 100 may travel along a velocity vector 110. As the unpowered vehicle 100 is traveling, various force vectors are shown to be enacted. These force vectors include: a normal force 120 (due to pressure on the surface of the vehicle 100), a lift force 130, a drag force 140, an axial force 150, and weight. As shown in FIG. 1, in contrast to the normal force and axial force vectors (which are "body-fixed"), lift and drag force vectors are not "body-fixed" and are normal and parallel, respectively, to the velocity vector 110. Moreover, X and Z-directions represent X and Z-body-axes of a body-axes coordinate system.

As further illustrated, according to a short-period pitch oscillation, when the vehicle 100 points to a particular direction of flight, the force vectors may be expressed with respect to the incidence angle (a). Utilizing these applied forces, an accelerometer 115 may be used during flight to measure first and second body-fixed load factor components ($N_X$ and $N_Z$) (i.e., first and second body-fixed load factor measurements, first and second body-axes load factor measurements). In certain implementations, the accelerometer 115 may be located on the vehicle 100 at the center of gravity (CG) of the vehicle 100 or may be mathematically-corrected to the center of gravity of the vehicle 100.

As an example, the first body-fixed load factor component, $N_X$ is expressed as a quotient of a magnitude of axial force and weight, while the second body-fixed load factor component, $N_Z$ is expressed as a quotient of a magnitude of normal force and weight. Moreover, as utilized in the inventive systems and methods (as described herein), the quotient of the first and second body-fixed load factor components may be substantially equivalent to a quotient of a particular first and second body-fixed coefficients ($C_X$ and $C_Z$) (as described in below paragraphs).

Hence, $$\frac{Nx}{Nz} = \frac{Cx}{Cz}.$$

Advantageously, in certain implementations, this relationship is utilized in the inventive systems and methods as described herein.

In some implementations, a desired flight profile for the vehicle 100 may include settings for the vehicle 100 to operate at angle-of-attack orientation allowing for the greatest lift-to-draft (L/D) for maximum distance coverage. The Lip term (i.e., L/D ratio) may be computed for a particular airspeed by measuring the lift generated in comparison with the drag at that speed. For calculation purposes, the lift-to-draft ratio may be determined by dividing the lift coefficient $C_L$ by the drag coefficient $C_D$.

For the following graphical representations (FIGS. 2-11) of the systems and methods described herein, an aircraft may dispense the vehicle 100 (e.g., a small glider) for damage assessment. In other cases, the vehicle 100 may perform weather measurements, various military operations (including weapons deployment), etc. In the example, the vehicle 100 includes a weight of 1-pound, a wingspan of 16-inch, and a 2-inch wing-chord. For each of the graphical representations (200-1100), the Y-component ranges may vary depending upon weight, wingspan, and wing-chord characteristics of the particular vehicle.

Figure 2:
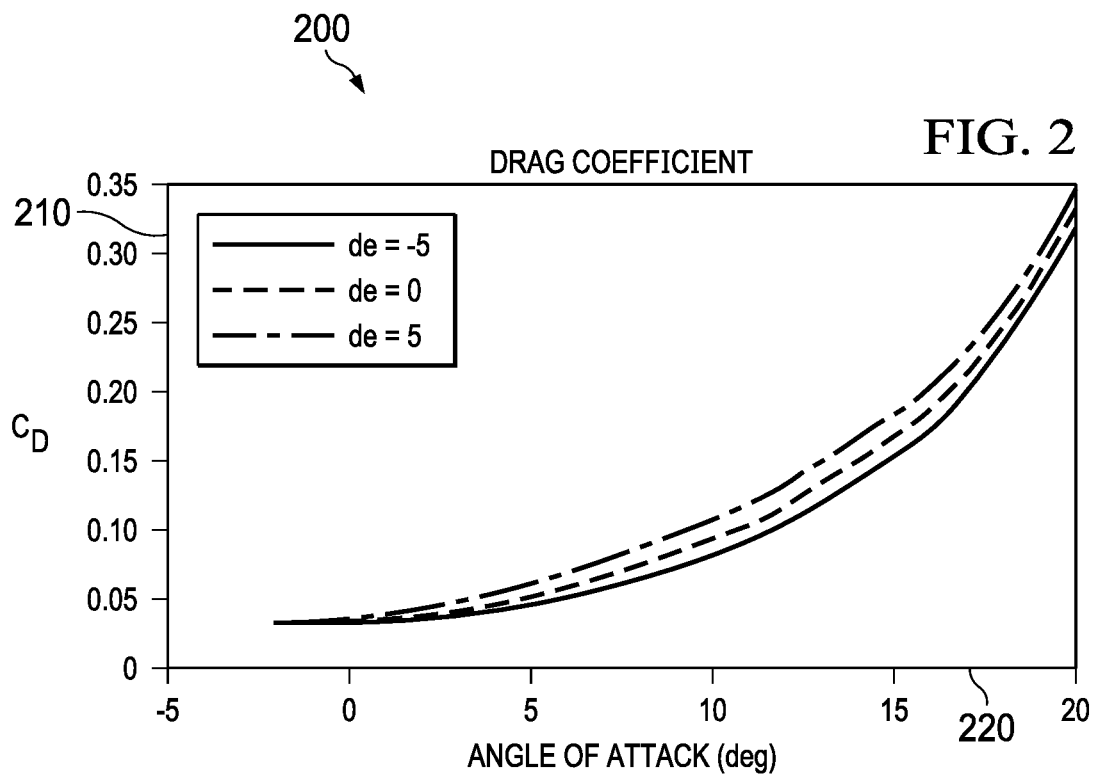
FIG. 2 illustrates a graphical representation in accordance with implementations of various techniques described herein.

In FIG. 2, graph 200 illustrates estimated drag coefficient curves for three elevator deflection settings (de): −5, 0, and 5. As shown, graph 200 includes an expected range for drag, as represented as drag coefficient values $C_D$ (from 0 to 0.35) for the vehicle 100 (on the Y-axis) 210, as a function of a range of angle-of-attack directions (from −5° to 20°) (on the X-axis) 220. In certain implementations, the drag coefficient $C_D$ is a dimensionless quantity that may be used to quantify the drag or resistance of the vehicle 100 in a fluid environment, such as air or water.

Figure 3:
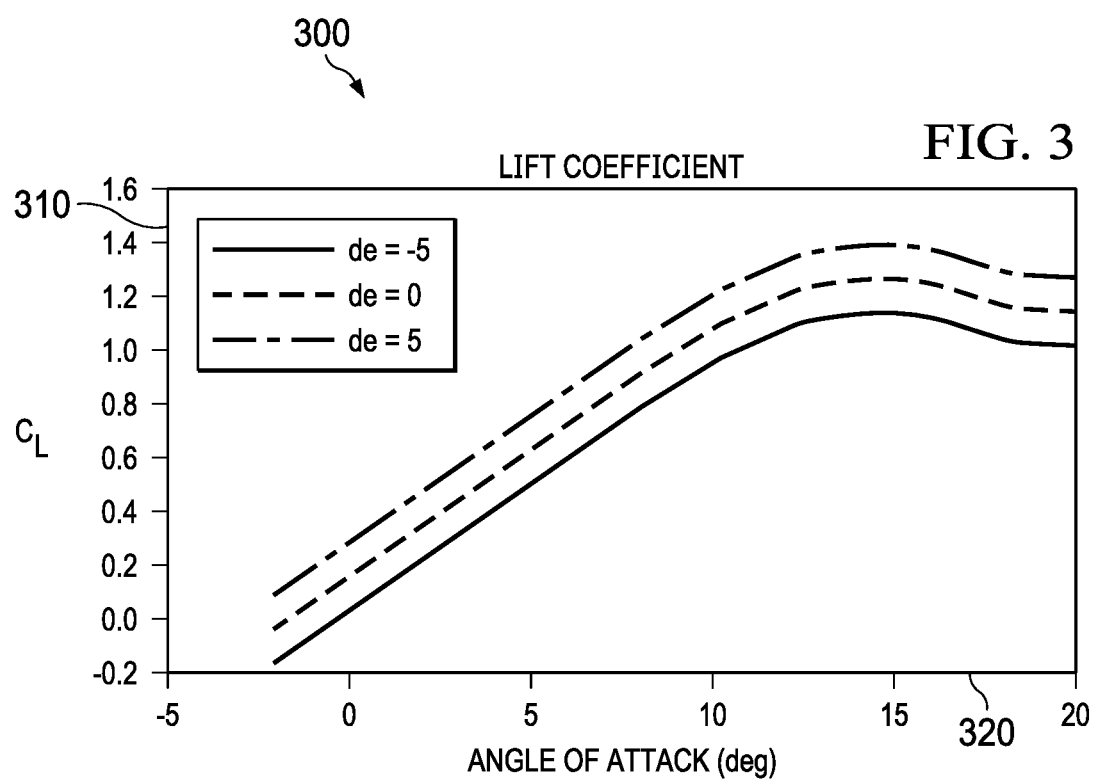
FIG. 3 illustrates a graphical representation in accordance with implementations of various techniques described herein.

In FIG. 3, graph 300 illustrates estimated lift coefficient curves for the three elevator deflection settings (de): −5, 0, and 5. As shown, graph 300 includes an expected range for lift, as represented as lift coefficient values $C_L$ (from −2 to 1.6), for the vehicle 100 (on the Y-axis) 310, as a function of the range of angle-of-attack directions (from −5" to 20°) (on the X-axis) 320. In certain implementations, the lift coefficient $C_L$ is a dimensionless quantity that may be used to quantify the lift generated by the vehicle 100 to the fluid density around the vehicle 100, the fluid velocity, and an associated foil chord of the vehicle 100.

In certain implementations, the lift and drag coefficient values are aerodynamic data characteristics (i.e., first and second aerodynamic data values) that may be obtained by estimating the range of the body-fixed accelerations $C_X/C_Z$ (as described in below paragraphs) for the vehicle 100 or by measuring wind tunnel data with respect to the vehicle 100.

Figure 4:
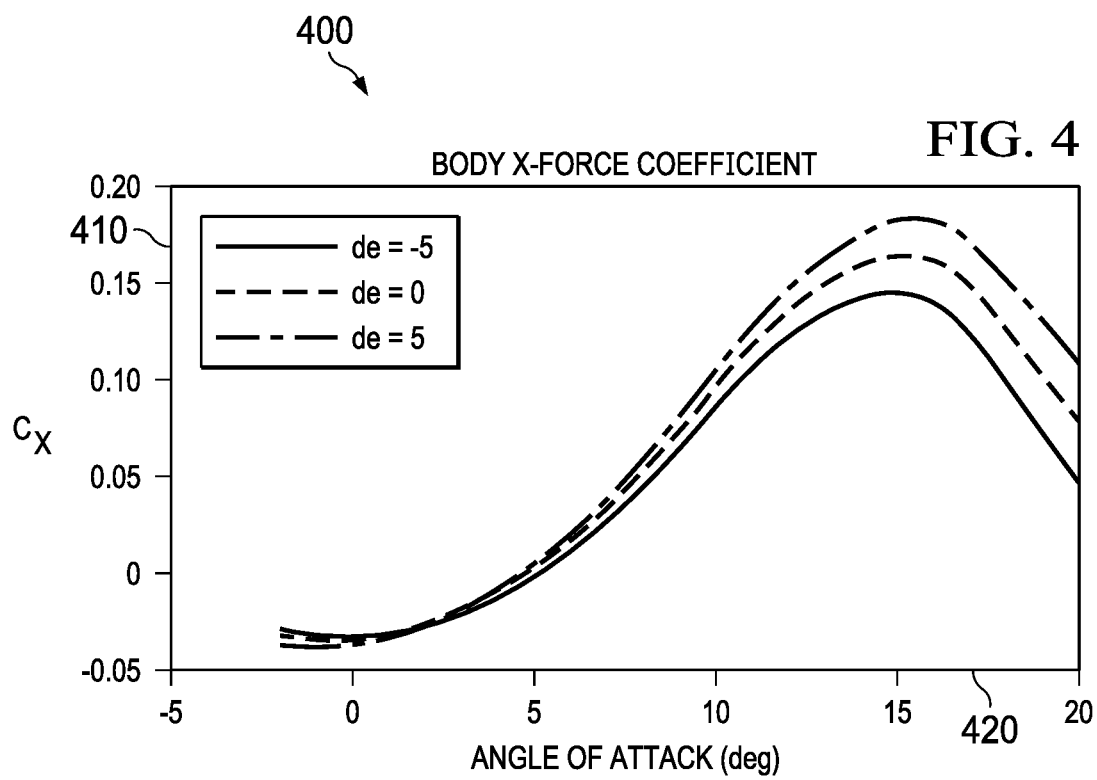
FIG. 4 illustrates a graphical representation in accordance with implementations of various techniques described herein.
Figure 5:
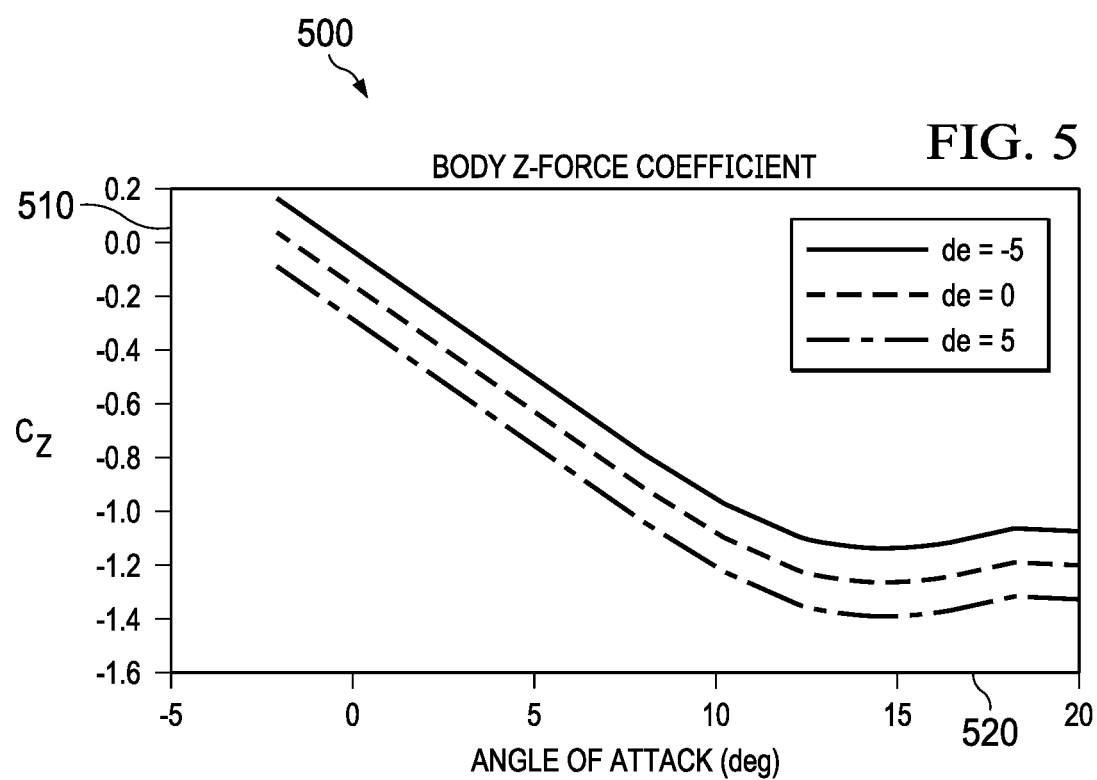
FIG. 5 illustrates a graphical representation in accordance with implementations of various techniques described herein.

FIGS. 4 and 5 illustrate the drag coefficient values $C_D$ and lift coefficient values $C_L$ transformed to body-fixed coefficients: body X-force coefficient (i.e., first body-fixed coefficient) and body Z-force coefficient $C_Z$ (i.e., second body-fixed coefficient), respectively. In one implementation, the first and second body-fixed coefficients $C_X$ and $C_Z$ may be determined through computation of the following equations:

$$C_X = -C_D \cos \alpha + C_L \sin \alpha$$

$$C_Z = -C_L \cos \alpha - C_D \sin \alpha$$

In FIG. 4, graph 400 illustrates the body X-force coefficient (i.e., the first body-fixed coefficient) for the three elevator deflection settings (de): −5, 0, and 5. As shown, graph 400 includes a range of body X-force coefficients (from −0.05 to 0.2) (on the Y-axis) 410 as a function of the range of angle-of-attack directions (from −5° to 20°) (on the X-axis) 420.

In FIG. 5, graph 500 illustrates the body Z-force coefficient (i.e., the second body-fixed coefficient) for the three elevator deflection settings (de): −5, 0, and 5. As shown, graph 500 includes a range of body Z-force coefficients (from −1.6 to 0.2) (on the Y-axis) 510 as a function of the range of angle-of-attack directions (from −5° to 20°) (on the X-axis) 520.

Figure 6:
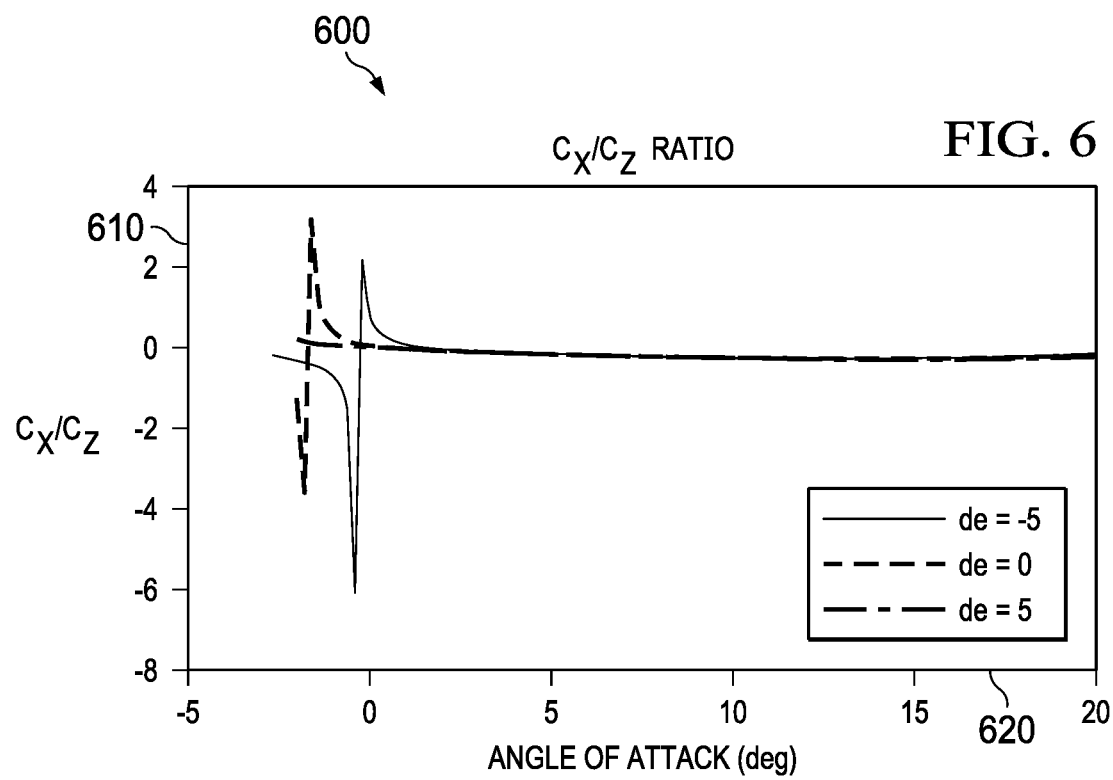
FIG. 6 illustrates a graphical representation in accordance with implementations of various techniques described herein.

In FIG. 6, graph 600 illustrates the $C_X/C_Z$ ratio for the three elevator deflection settings (de): −5, 0, and 5. As shown, graph 600 includes the $C_X/C_Z$ ratio (from −8 to 4) (on the Y-axis) 610 as a function of the range of angle-of-attack directions (from −5° to 20°) (on the X-axis) 620. Notably, a collapse may be seen on the graph curvature ($C_X/C_Z$ ratio plot points over a range of usable angle-of-attack) for the "0" elevator deflection setting.

Figure 7:
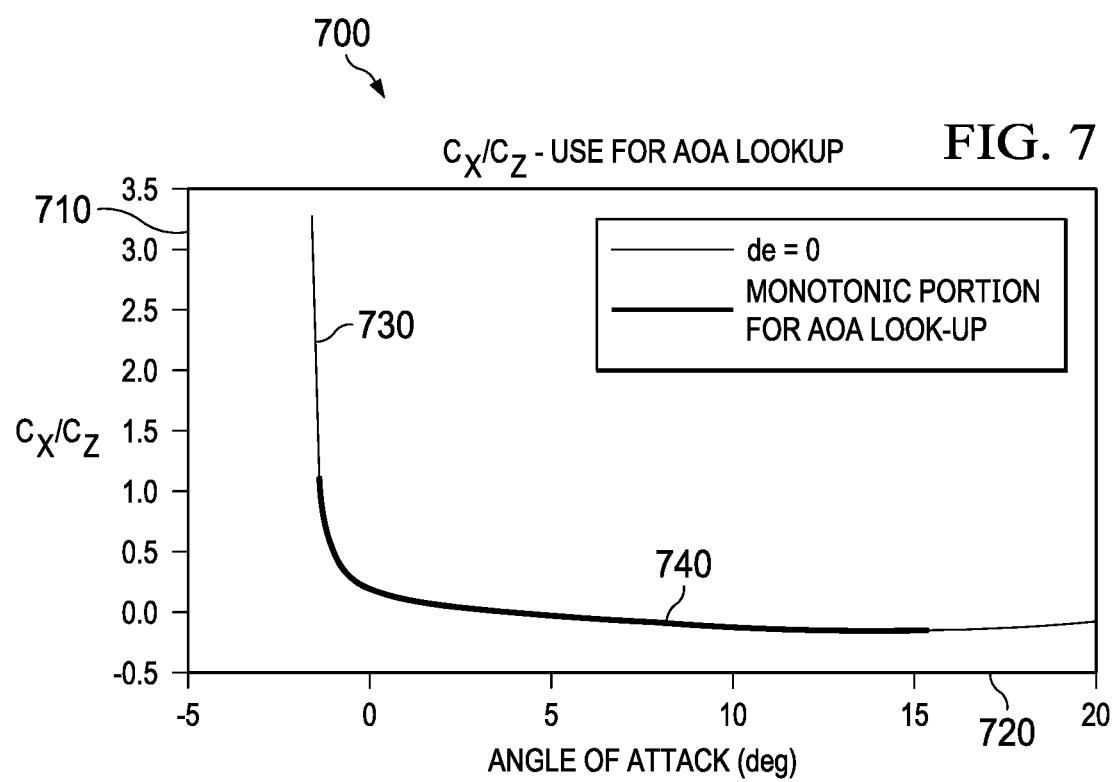
FIG. 7 illustrates a graphical representation in accordance with implementations of various techniques described herein.

In FIG. 7, graph 700 illustrates a portion of the $C_X/C_Z$ ratio for the "0" elevator deflection setting (de=0) from FIG. 6. As shown, graph 700 (i.e., an angle-of-attack operating plot, angle-of-attack operating map, angle-of-attack look-up plot) includes the $C_X/C_Z$ ratio (from −0.5 to 3/5) (on the Y-axis) 710 as a function of the range of angle-of-attack directions (from −5° to 20°) (on the X-axis) 720. Notably, a monotonic portion 740 (of the $C_X/C_Z$ ratio as a function of the range of angle-of-attack directions) of a $C_X/C_Z$ look-up curve 730 (i.e., a monotonic curve, body-fixed accelerations curve) (e.g., a portion of the curvature 730 that does not increase) can serve as a look-up curve (i.e., a look-up table) or be applied in curve-fitting for a range (i.e., a plurality) of prospective (i.e., possible, useful) angle of attack operating points. In one implementation, a particular operating point on the monotonic portion may be determined by applying a quotient of the first and second accelerometer outputs (i.e., $N_X/N_Z$) to the angle-of-attack operating (look-up) plot 700. For instance, this may be applied by matching a quotient of the first and second accelerometer outputs ($N_X/N_Z$) to a substantially equivalent body-fixed acceleration ($C_X/C_Z$), where the body-fixed acceleration ($C_X/C_Z$) may correspond to a particular quotient of a particular first and second body-fixed coefficients ($C_X$, $C_Z$). Upon matching $$\frac{Nx}{Nz} = \frac{Cx}{Cz},$$

a computer system (e.g., such as any of the computers in flight computer system 1300) may determine an angle-of-attack parameter that corresponds to the determined operating point.

Accordingly, in the example methods, after the drag coefficient values $C_D$ and the lift coefficient values $C_L$ are transformed into respective components of the first and second body-fixed coefficients $C_X$ and $C_Z$, a $C_X/C_Z$ ratio (i.e., a body-fixed acceleration) may be used to establish the monotonic portion 740 for angle-of-attack look-up. Moreover, measured accelerometer components $N_X$ and $N_Z$ may be divided and matched on a monotonic portion of a lookup curve on a plot comparing body-fixed accelerations to prospective AOA parameters. Further, an operating point that aligns to the Y-axis may be used to determine where on the X-axis (of prospective AOA parameters) alignment takes place.

In FIG. 8, graph 800 illustrates a lift-to-drag ratio $C_L/C_D$ for the three elevator deflection settings (de): −5, 0, and 5. As shown, graph 800 includes the lift-to-drag ratio $C_L/C_D$ (from −5 to 15) (on the Y-axis) 810 as a function of the range of angle-of-attack directions (from −5° to 20°) (on the X-axis) 820. Notably, provided on lift-to-drag ratio $C_L/C_D$ curves 830, graph 800 depicts the respective operating points 834 (for the three elevator deflection settings) and the corresponding AOA parameter 836 for selection of an ideal angle-of-attack operating point, if an optimal lift-to-drag ratio is to be prioritized. In such an example, the angle-of-attack parameter corresponds to a lift-to-drag-optimized angle-of-attack.

In FIG. 9, graph 900 illustrates a lift-to-drag $C_L^{3/2}/C_D$ ratio (i.e., a second lift-to-drag ratio) for the three elevator deflection settings (de): −5, 0, and 5. As shown, graph 900 includes the second lift-to-drag $C_L^{3/2}/C_D$ ratio (from 0 to 154) (on the Y-axis) 910 as a function of the range of angle-of-attack directions (from −5° to 20°) (on the X-axis) 920. Notably, graph 900 depicts the respective operating points 934 (for the provided deflection settings) and the corresponding AOA parameter 936 selection if a minimum power point (i.e., a minimum sink rate) is to be prioritized. In such an example, the angle-of-attack parameter corresponds to a minimum-sink rate-optimized angle of attack. In other examples, a combination of two criteria (lift-to-drag and minimum sink-rate) may be used in evaluation for an optimal AOA.

FIG. 10 illustrates time history results of a six-degree-of-freedom flight simulation of the vehicle 100 capturing 7° angle-of-attack to operate near maximum lift-to-drag. In FIG. 10A, graph 1000 includes angle of attack (from 3.5° to 7°) (on the Y-axis) 1010 as a function of time (0-200 seconds) (on the X-axis) 1020. The angle-of-attack comparison shows the comparison of a simulation vehicle angle-of-attack (as shown as the solid line in FIG. 10) with the estimated angle-of-attack (as shown as the dashed-line in FIG. 10), according to examples as described herein. The estimated angle-of-attack shown is the result of using the ratio $N_X/N_Z$ from the body-fixed accelerations (i.e., $C_X/C_Z$) as input to a table look-up of the monotonic portion of the body-fixed accelerations (i.e., $C_X/C_Z$) curve as discussed with reference to FIG. 7 above. As an additional graph for reference purposes, in FIG. 11, graph 1100 illustrates Lift/Drag ratio (from 0-12.2) (on the Y-axis) 1110 as a function of time (0-200 seconds) (on the X-axis) 1120.

Figure 12:
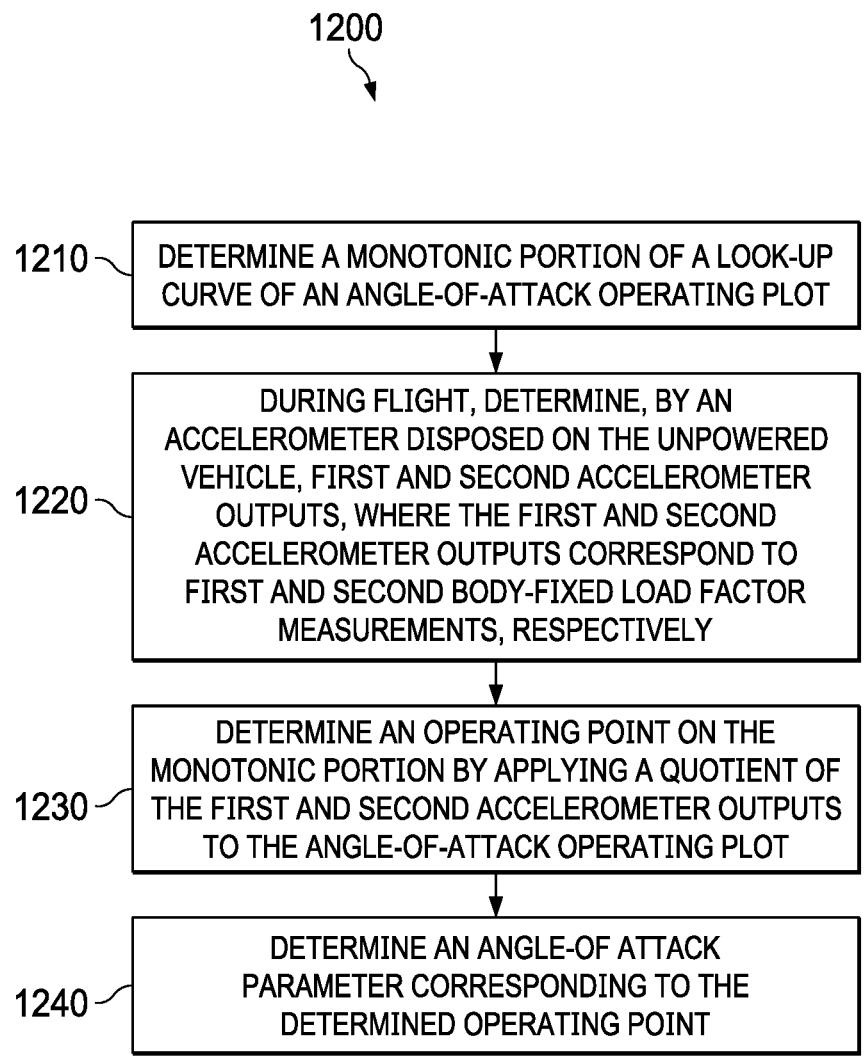
FIG. 12 is a particular illustrative aspect of methods in accordance with implementations of various techniques described herein.

Referring to FIG. 12, a method 1200 (e.g., implemented as an AMA optimization program) for determining angle-of-attack for an unpowered vehicle 100 applicable for the flight computer system 1300 (as described with reference to FIG. 13) is shown.

At block 1210, the method 1200 includes determining a monotonic portion of a look-up curve of an angle-of-attack operating plot. For example, in certain implementations, with reference to FIG. 7, a monotonic portion 740 of a look-up curve 730 (i.e., a monotonic curve, table look-up; body-fixed accelerations curve) of an angle-of-attack operating plot 700 may be determined (i.e., identified, generated). In some implementations, a monotonic portion 740 of a look-up curve 730 of an angle-of-attack operating plot 700, may be generated prior to an implementation of the method 1200 in any computer either networked to or outside of the computer system 1300, and in other implementations, a monotonic portion 740 of a look-up curve 730 of an angle-of-attack operating plot 700, may be performed concurrently (i.e., in real-time) in any computer networked to the computer system 1300 as part of the method 1200.

As discussed with reference to FIGS. 2-7 (in above paragraphs), determining a monotonic portion of a look-up curve of an angle-of-attack operating plot may include the following steps: (1) obtaining pluralities of first and second aerodynamic data characteristics (i.e., values, metrics) as respective functions of a range of angle-of-attack directions; (2) computing, by a processor (e.g., a microcontroller, onboard flight control processing device), pluralities of first and second body-fixed coefficients ($C_X$ and $C_Z$) as the respective functions of the range of angle-of-attack directions; (3) determining, by the processor, a plurality of body-fixed accelerations (i.e., $C_X/C_Z$ as a function of a prospective range of the range of angle-of-attack directions based on respective pluralities of quotients of the first and second body-fixed coefficients as the respective functions of the range of angle-of-attack directions, where the determined plurality of body-fixed accelerations (i.e., $C_X/C_Z$) as a function of a prospective range of the range of angle-of-attack directions corresponds to the look-up curve of the angle-of-attack operating plot; and (4) determining the monotonic portion based on a filtering, by the processor, of the look-up curve.

At block 1220, the method 1200 includes during flight, determining, by an accelerometer disposed on the unpowered vehicle, first and second accelerometer outputs, where the first and second accelerometer outputs correspond to first and second body-fixed load factor measurements, respectively. For example, as described with reference to FIG. 1, first and second body-fixed load factor measurements ($N_X$ and $N_Z$) can be measured with the aid of an accelerometer 115 disposed on the unpowered vehicle 100.

At block 1230, the method 1200 includes determining an operating point on the monotonic portion by applying a quotient of the first and second accelerometer outputs to the angle-of-attack operating plot. For example, as described with reference to FIGS. 1 and 7, a particular operating point on the monotonic portion 740 may be determined by applying a quotient of the first and second accelerometer outputs (i.e., $N_X/N_Z$) to the angle-of-attack operating plot 700.

In one implementation, step 1230 is carried out by matching a quotient of the first and second accelerometer outputs ($N_X/N_Z$) to a substantially equivalent body-fixed acceleration ($C_X/C_Z$), where the body-fixed acceleration ($C_X/C_Z$) may correspond to a particular quotient of a particular first and second body-fixed coefficients ($C_X$, $C_Z$).

At block 1240, the method 1200 includes determining an angle-of-attack parameter corresponding to the determined operating point. For example, as discussed with reference with $$\frac{Nx}{Nz} = \frac{Cx}{Cz},$$

FIG. 7, upon matching a computer system (e.g., such as any computer of computer system 1300) may determine an angle-of-attack parameter that corresponds to the determined operating point.

The method 1200 include further steps such as: in response to determining the angle-of-attack parameter at least one of: (1) generating, at least partially by a flight computer system, a flight profile of the unpowered vehicle; and (2) adjusting (i.e., correcting), at least partially by the flight computer system (and a closed-loop system), an angle-of-attack setting of the unpowered vehicle based on the angle-of-attack parameter.

Advantageously, for instance, the computer system 1300 (as described with reference to FIG. 13) may generate a flight profile for the vehicle 100. The flight profile may be based on the determined AOA parameter and may include: an optimal AOA for lift-to-drag-optimized angle-of-attack, an optimal AOA for minimum-sink rate-optimized angle of attack, or a combination thereof. The flight computer system may further adjust (correct for) an angle-of-attack setting of the unpowered vehicle 100 based on the determined angle-of-attack parameter such that an associated closed-loop control system may automatically correct the unpowered vehicle in real-time. In addition, the determined AOA parameter may also be used in AOA feedback for stability augmentation (i.e., to improve static stability) in a linear range and also may be used as a stall warning. Accordingly, an operator (e.g., pilot, engineer, aerodynamicist, or flight computer) may evaluate that a determined AOA parameter corresponds to a determined operating point in a sub-optimal region, and thus, the operator may take further actions (such as determining an improved operating point) to bring the AOA of the unpowered vehicle 100 "back" to the optimal AOA.

Figure 13:
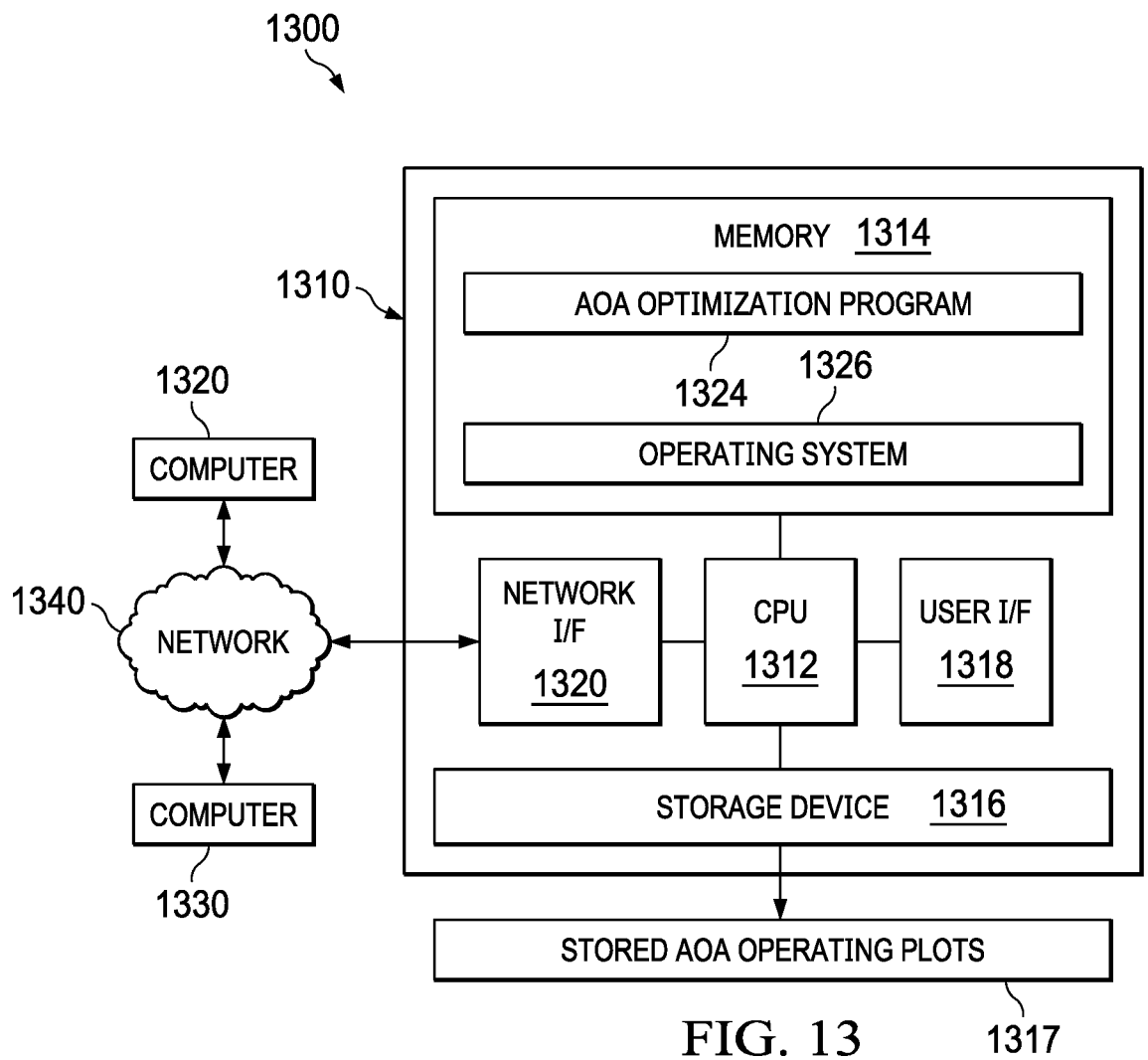
FIG. 13 is a block diagram of a computer system in accordance with implementations of various techniques described herein.

FIG. 13 is a diagram depicting the computer system 1300 (e.g., networked computer system and/or server) for the example unpowered vehicle 100 (as described in FIG. 1), according to one implementation. FIG. 13 illustrates example hardware components in the computer system 1300 that may be used to determine and/or correct (i.e., adjust) an angle-of-attack parameter (i.e., orientation) for the vehicle 100. The computer system 1300 includes a computer 1310 (e.g., computer, flight computer system, flight controls and avionics computer system), which may be implemented as a server or a multi-use computer that is coupled via a network 1340 to one or more networked (client) computers 1320, 1330. The method 1200 may be stored as program code (i.e., AOA optimization program 1324) in memory that may be performed by the computer 1310, the computers 1320, 1330, other networked electronic devices (not shown) or a combination thereof. In some implementations, the AOA optimization program 1324 may read input data (e.g., received measurements from the accelerometer 115 and operating plot data of respective angle-of-attack operating plots 1317) and provide controlled output data to various connected computer systems including an associated closed-loop control system. In certain implementations, each of the computers 1310, 1320, 1330 may be any type of computer, computer system, or other programmable electronic device. Further, each of the computers 1310, 1320, 1330 may be implemented using one or more networked (e.g., wirelessly networked) computers, e.g., in a cluster or other distributed computing system. Each of the computers 1310, 1320, 1330 may be implemented within a single computer or programmable electronic device, e.g., an aircraft flight control computer, a ground-based flight control system, a flight monitoring terminal, a laptop computer, a hand-held computer, phone, tablet, etc. In one example, the computer system 1310 may be an onboard flight control computer (e.g., that is configured to receive accelerometer data from the vehicle 100) on a dispensing aircraft. In such an example, the computer 1320 may be located on the vehicle 100 (e.g., to transmit data from the accelerometer 115 located on the vehicle 100), and the computer 1330 (e.g., that is also configured to receive the accelerometer data from the vehicle 100) may be a part of the computer system 1300 at a ground location monitoring the aircraft and the vehicle 100.

Advantageously, in example implementations, one or more of the computers 1310, 1320, and 1330 of the flight computer system 1300 may generate a flight profile of the unpowered vehicle 100 and/or adjust (in some instances, automatically) an angle-of-attack configuration (i.e., setting) of the unpowered vehicle 100 based on a determined angle-of-attack parameter of the unpowered vehicle 100.

In one implementation, the computer 1300 includes a central processing unit (CPU) 1312 having at least one hardware-based processor coupled to a memory 1314. The memory 1314 may represent random access memory (RAM) devices of main storage of the computer 1310, supplemental levels of memory (e.g., cache memories, non-volatile or backup memories (e.g., programmable or flash memories)), read-only memories, or combinations thereof. In addition to the memory 1314, the computer system 1300 may include other memory located elsewhere in the computer 1310, such as cache memory in the CPU 1312, as well as any storage capacity used as a virtual memory (e.g., as stored on a storage device 1316 or on another computer coupled to the computer 1310). The memory 1314 may include an AOA optimization program 1324 to determine an AOA parameter of the vehicle 100, and the storage device 1316 may include monotonic portions on respective angle-of-attack operating plots 1317 for a variety of different vehicles (to be utilized with the AOA optimization program 1324) (as described in greater detail with reference to FIGS. 7, 12, and 13). In certain implementations, the AOA optimization program 1324 may determine optimal AOA parameters and adjust (e.g., automatically in some instances) AOA configurations based on the optimal AOA parameters utilizing the monotonic portions (e.g., monotonic portion 740) of the stored AOA operating plots 1317.

In FIG. 13, the storage device 1316 is shown to include the stored (monotonic portions on respective) angle-of-attack operating plots 1317. In other alternative implementations, (the monotonic portions on respective) the angle-of-attack operating plots 1317 may be stored in the memory 1314, in memory in the computers 1320, 1330, or in any other connected or networked memory storages devices. In some implementations, a monotonic portion for a particular angle-of-attack operating plot may be determined in real-time and concurrent with the AOA optimization operation 1324. In other implementations, a monotonic portion for a particular angle-of-attack operating plot may be determined prior to the AOA optimization operation 1324.

The computer 1310 may further be configured to communicate information externally. To interface with a user or operator (e.g., aerodynamicist, engineer), the computer 1310 may include a user interface (I/F) 1318 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 1310 may include a network interface (I/F) 1320 which may be coupled to one or more networks 1340 (e.g., a wireless network) to enable communication of information with other computers and electronic devices. The computer 1310 may include analog and/or digital interfaces between the CPU 1312 and each of the components 1314, 1316, 1318 and 1320. Further, other non-limiting hardware environments may be used within the context of example implementations.

The computer 1310 may operate under the control of an operating system 1326 and may execute or otherwise rely upon various computer software applications, components, programs, objects, modules, data structures, etc. (such as the AOA optimization program 1324 and related software). The operating system 1326 may be stored in the memory 1314. Operating systems include, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 1326 and the AOA optimization program 1324 in the example of FIG. 13 are shown in the memory 1314, but components of the aforementioned software may also, or in addition, be stored at non-volatile memory (e.g., on storage device 1316 (data storage) and/or the non-volatile memory (not shown). Moreover, various applications, components, programs, objects, modules, etc. may also execute on one or more processors in another computer coupled to the computer 1310 via the network 1340 (e.g., in a distributed or client-server computing environment) where the processing to implement the functions of a computer program may be allocated to multiple computers 1320, 1330 over the network 1340.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 1314, the storage device 1316, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for determining an angle-of-attack for an unpowered vehicle, comprising:
   determining an operating point on an angle-of-attack operating plot;
   determining an angle-of-attack parameter corresponding to the determined operating point;
   adjusting, at least partially, an angle-of-attack setting of the unpowered vehicle based on the angle-of-attack parameter; and
   bringing the unpowered vehicle to an optimal angle of attack based on the angle-of-attack setting.

2. The method of claim 1, wherein the operating point is determined on a monotonic portion of a look-up curve of the angle-of-attack operating plot.

3. The method of claim 2, wherein the monotonic portion corresponds to a plurality of body-fixed accelerations as a function of a plurality of angle-of-attack parameters, and wherein the plurality of angle-of-attack parameters corresponds to a respective range of prospective angle-of-attack directions.

4. The method of claim 3, wherein the angle-of-attack parameter of the plurality of angle-of-attack parameters corresponds to one direction of the range of the prospective angle-of-attack directions, and wherein the angle-of-attack parameter corresponds to a lift-to-drag-optimized angle-of-attack, a minimum-sink rate-optimized angle of attack, or a combination thereof.

5. The method of claim 3, wherein the plurality of body-fixed accelerations corresponds to a quotient of the pluralities of first and second body-fixed coefficients.

6. The method of claim 5, wherein the plurality of a first body-fixed coefficient is based on a corresponding plurality of a first aerodynamic data characteristic and a range of angle-of-attack directions.

7. The method of claim 6, wherein the plurality of a first aerodynamic data characteristic comprises a plurality of lift coefficient metrics.

8. The method of claim 5, wherein the plurality of a second body-fixed coefficient is based on a corresponding plurality of a second aerodynamic data characteristic and a range of angle-of-attack directions.

9. The method of claim 8, wherein the plurality of a second aerodynamic data characteristic comprises a plurality of drag coefficient metrics.

10. The method of claim 2, wherein determining the monotonic portion of the look-up curve of the angle-of-attack operating plot comprises:
    obtaining pluralities of first and second aerodynamic data characteristics as respective functions of a range of angle-of-attack directions;
    computing, by a processor, pluralities of first and second body-fixed coefficients as the respective functions of the range of angle-of-attack directions;
    determining, by the processor, a plurality of body-fixed accelerations as a function of a prospective range of the range of angle-of-attack directions based on respective pluralities of quotients of the first and second body-fixed coefficients as the respective functions of the range of angle-of-attack directions, wherein the determined plurality of body-fixed accelerations as a function of a prospective range of the range of angle-of-attack directions corresponds to the look-up curve of the angle-of-attack operating plot; and
    determining the monotonic portion based on a filtering, by the processor, of the look-up curve.

11. The method of claim 10, wherein the pluralities of first and second aerodynamic data characteristics are obtained by estimating the range of the body-fixed accelerations for the vehicle or by measuring wind tunnel data with respect to the vehicle.

12. The method of claim 10, wherein a graph comparing a range of body-fixed accelerations as a function of the prospective range of the range of angle-of-attack directions corresponds to the angle-of-attack operating plot.

13. The method of claim 2, wherein the operating point is determined by applying a quotient of first and second accelerometer outputs to the angle-of-attack operating plot, and wherein applying the quotient of the first and second accelerometer outputs comprises:
    matching a quotient of the first and second accelerometer outputs to a substantially equivalent body-fixed acceleration, wherein the body-fixed acceleration corresponds to a particular quotient of a particular first and second body-fixed coefficients, and wherein the particular quotient of the first and second body-fixed coefficient corresponds to a particular respective first and second aerodynamic data characteristic.

14. The method of claim 13, wherein the particular respective first and second aerodynamic data characteristic corresponds to a particular respective lift coefficient metric and drag coefficient metric.

15. The method of claim 1, further comprising:
during flight, determining, by an accelerometer disposed on the unpowered vehicle, first and second accelerometer outputs, wherein the first and second accelerometer outputs correspond to first and second body-fixed load factors, respectively.

16. The method of claim 15, wherein a measurement of the first body-fixed load factor corresponds to a quotient of a magnitude of axial force and weight, and wherein a measurement of the second body-fixed load factor corresponds to a quotient of a magnitude of normal force and weight.

17. The method of claim 1, further comprising, in response to determining the angle-of-attack parameter:
generating, at least partially by a flight computer system, a flight profile of the unpowered vehicle.

18. The method of claim 1, wherein the operating point corresponds to a particular body-fixed acceleration as function of a corresponding particular angle-of-attack parameter.

19. A flight computer system comprising:
a processor; and
a memory accessible to the processor, the memory storing instructions that are executable by the processor to perform operations comprising:
determining an operating point on an angle-of-attack operating plot;
determining an angle-of-attack parameter corresponding to the determined operating point;
adjusting, at least partially by the flight computer system, an angle-of-attack setting of an unpowered vehicle based on the angle-of-attack parameter; and
bringing the unpowered vehicle to an optimal angle of attack based on the angle-of-attack setting.

20. A non-transitory computer-readable storage device storing instructions that, when executed by a processor, cause the processor to:
determine an operating point on an angle-of-attack operating plot;
determine an angle-of-attack parameter corresponding to the determined operating point;
adjust, at least partially by the processor, an angle-of-attack setting of an unpowered vehicle based on the angle-of-attack parameter; and
bring the unpowered vehicle to an optimal angle of attack based on the angle-of-attack setting.

* * * * *